(No Model.) 2 Sheets—Sheet 1.
H. A. HOUSE & H. A. HOUSE, Jr.
LUBRICATING DEVICE.
No. 521,958. Patented June 26, 1894.
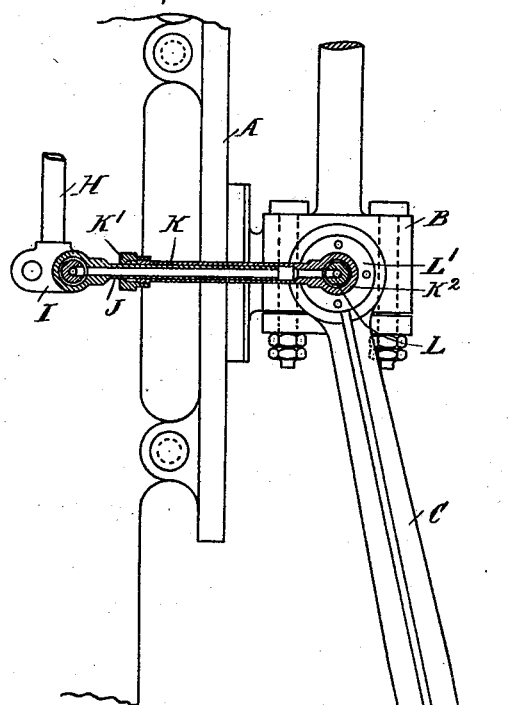
—Fig 1.—
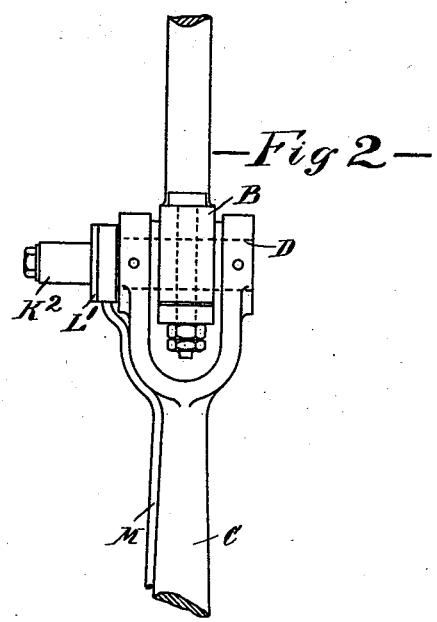
—Fig 2—
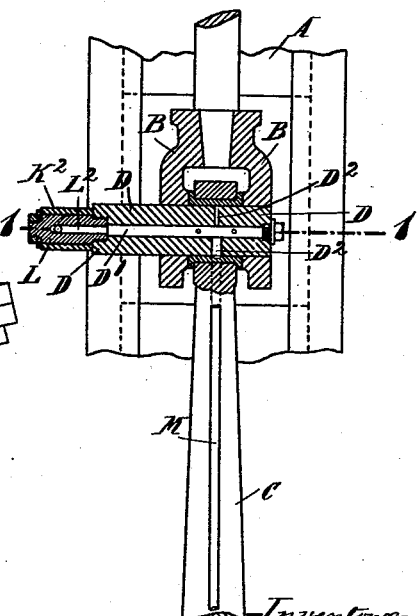
—Fig 3.—
—Fig 4.—
Witnesses:
William Henry Beck
Stephen Edward Cymyon
Inventors:
Henry A. House
Henry A. House Junior (No Model.) 2 Sheets—Sheet 2.
H. A. HOUSE & H. A. HOUSE, Jr.
LUBRICATING DEVICE.
No. 521,958. Patented June 26, 1894.
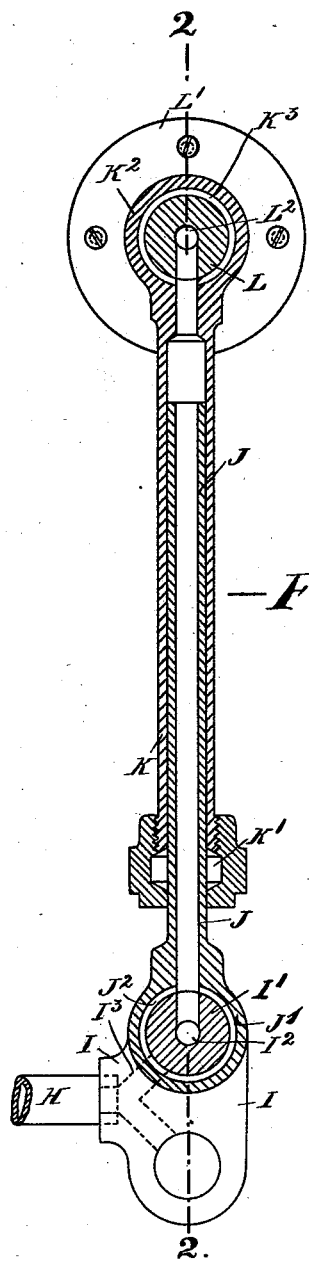
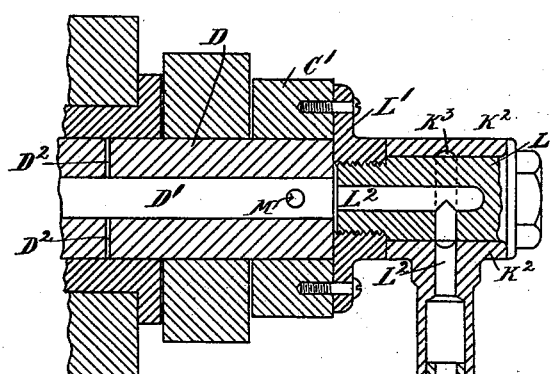
Fig 5.
Fig 6.
Witnesses.
William Henry Beck
Stephen Edward Gunzon
Inventors.
Henry A. House
Henry A. House Junior

UNITED STATES PATENT OFFICE.

HENRY A. HOUSE AND HENRY A. HOUSE, JR., OF BRIDGEPORT, CONNECTICUT, ASSIGNORS OF ONE-HALF TO ROBERT RINTOUL SYMON, OF LONDON, ENGLAND.

LUBRICATING DEVICE.

SPECIFICATION forming part of Letters Patent No. 521,958, dated June 26, 1894.

Application filed November 25, 1893. Serial No. 491,970. (No model.)

*To all whom it may concern:*

Be it known that we, HENRY ALONZO HOUSE, and HENRY ALONZO HOUSE, Jr., mechanical engineers, both citizens of the United States of America, and both temporarily residing at Teddington, in the county of Middlesex, England, but usually of Bridgeport, county of Fairfield, and State of Connecticut, United States of America, have invented a certain new and Improved Lubricating Device, of which the following is a specification.

This invention relates more especially to apparatus for lubricating or oiling the moving parts connected to the crosshead of a steam or other motive power engine, and also the crank pin of such an engine, especially when the crank pin is not overhung as in the case of a crank plate but is situated between two webs or crank arms, but it is also applicable to parts of other machinery which work in a similar way.

In the drawings hereto annexed Figure 1 represents in side elevation, partly in section, so much of the guide, crosshead, connecting rod and cranks of a vertical engine as is necessary to illustrate the application of the invention, and Fig. 2 is a front view taken at right angles to Fig. 1 of the crosshead and upper end of the connecting rod. These two figures illustrate the application of the invention to the case where the crosshead pin is fixed in the fork of the connecting rod, and turns or oscillates in bearings in the crosshead. Fig. 3 is a sectional elevation of a crosshead having the pin fixed in the cheeks thereof, the end of the connecting rod oscillating on the said fixed pin, and Fig. 4 is a sectional plan taken on the line 1—1 of Fig. 3. Fig. 5 shows to a larger scale the parts represented in section in Fig. 1, and Fig. 6 is a sectional plan taken on line 2—2 of Fig. 5.

Referring to Figs. 1, 2, 5 and 6 A represents the crosshead guide, B the crosshead, C the connecting rod the fork of which has secured in it, so that it will not turn therein, the crosshead pin D.

E is the crankshaft, F one of the crank webs or arms, and G the crank pin.

H is a pipe conducting the lubricating oil from any suitably placed reservoir to a connector I secured to the frame or other fixed part of the engine.

I' is a pin or stud secured to or formed with the connector I and having formed in it a passage $I^2$ which communicates by the passage $I^3$ with the oil supply pipe H.

J is a tube provided at one end with a socket or sleeve J' adapted to fit accurately on the pin or stud I', but free to turn easily thereon. A groove $J^2$ formed in the socket or sleeve J' (or if preferred in the pin or stud I') puts the interior of the tube J into communication with the passage $I^2$ whatever position the said tube may assume on the pin or stud I'.

K is a tube in which the tube J is free to slide telescopically through a stuffing box K'. The tube K is provided at the end opposite to the stuffing box K' with a socket or sleeve $K^2$ similar to the socket or sleeve $J^2$, and adapted to turn freely on the pin or stud L secured by a flange L', or otherwise, to the collar C' fixed on the crosshead pin D. The groove $K^3$ formed in the socket or sleeve $K^2$ (or if preferred in the pin or stud L) puts the interior of the tube K into communication with the passage $L^2$ in the pin or stud L whatever position the tube K may assume with reference to the said pin or stud. The passage $L^2$ is in direct communication with the passage D' in the crosshead pin D, and passages $D^2$ radiating from the passage D' lead the oil to the surfaces of the bearing for the crosshead pin D in the crosshead B.

It will now be understood that lubricating oil entering the connector I by the pipe H finds its way by the passages $I^3 I^2 J^2$, tubes J K, passages $L^2 K^3$ D' and $D^2$ to the surfaces of the bearing for the crosshead pin in the crosshead notwithstanding the reciprocating movement of the latter, the tube J sliding telescopically in and out of the tube K so as to preserve the continuity of the passages whatever may be the position of the crosshead. A tube M communicating at its upper end with the passage $L^2$ in the pin or stud L is carried down the connecting rod C to the bearings at the crank pin end thereof and supplies oil thereto for the lubrication of the crank pin G.

The lubricating apparatus above described is suitable for cases where the crosshead pin is fixed in the fork of the connecting rod but when the crosshead pin is fixed in the crosshead the arrangements for effecting the connection of the tube K with such fixed pin require to be somewhat modified as shown for example in Figs. 3 and 4. In these latter figures the letters of reference are similar to some of those in Figs. 1, 2, 5 and 6 and denote parts which are similar to or act in a like manner to the parts which are similarly lettered in those figures, and the action of such parts will be obvious from the description above given.

By means of the above described apparatus the crosshead and crank pin are kept lubricated automatically however quickly they may be running and without the necessity of stopping the engine or other machine for that purpose.

We claim—

In combination in a lubricating device for cross heads and crank pins, the cross head, the crank with its pin, the pitman connecting the cross head with the crank pin, the fixed connector I secured to the frame and having the oil supply pipe connected therewith and the closed oil conduit from the said fixed connector to the cross head pin and thence to the crank pin comprising the telescopic tubes extending from the fixed connector, the pin L connected with the tubes and with the cross head pin which is provided with an axial channel and the conduit M extending from the axial hole in the cross head pin along the pitman to the crank pin and completing the said closed conduit from the fixed connector, substantially as described.

In witness whereof we have hereunto set our hands in presence of two witnesses.

HENRY A. HOUSE.
  HENRY A. HOUSE, JUNIOR.

Witnesses:
 WILLIAM HENRY BECK,
 STEPHEN EDWARD GUNYON,
  *Both of* 115 *Cannon Street, London.*